(12) United States Patent
Hopman

(10) Patent No.: US 7,528,719 B2
(45) Date of Patent: May 5, 2009

(54) ASSET SEALING AND TRACKING SYSTEM AND METHOD

(75) Inventor: Nicholas C. Hopman, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 360 days.

(21) Appl. No.: 11/304,290

(22) Filed: Dec. 15, 2005

(65) Prior Publication Data
US 2007/0139197 A1    Jun. 21, 2007

(51) Int. Cl.
*G08B 13/14* (2006.01)
(52) U.S. Cl. .................. 340/572.1; 340/568.1; 340/571
(58) Field of Classification Search .............. 340/568.1, 340/571, 572.1
See application file for complete search history.

(56) References Cited

U.S. PATENT DOCUMENTS

| 4,918,690 | A | 4/1990 | Markkula |
| 5,428,636 | A | 6/1995 | Meier |
| 5,959,568 | A * | 9/1999 | Woolley ................. 340/572.1 |
| 6,300,880 | B1 | 10/2001 | Sitnik |
| 6,714,121 | B1 * | 3/2004 | Moore ....................... 340/10.3 |
| 6,745,027 | B2 * | 6/2004 | Twitchell, Jr. ............ 455/422.1 |
| 6,859,831 | B1 | 2/2005 | Gelvin et al. |
| 7,173,530 | B2 * | 2/2007 | Lambright et al. ....... 340/572.8 |
| 2003/0065784 | A1 | 4/2003 | Herrod |

FOREIGN PATENT DOCUMENTS

WO    WO-2004079679 A1 *  9/2004

* cited by examiner

*Primary Examiner*—George A Bugg
*Assistant Examiner*—Samuel J Walk (57) ABSTRACT

A system and method of asset sealing and tracking includes a first RFID device with a first identity that is permanently affixed to a container door, and removable second RFID device with a second identity is coupled to the first RFID device—and inserted through a locking hasp of the container door. The first RFID device inherits the second identity of the second RFID device thereby automatically associating the two devices. Thereafter the first RFID device broadcasts both identities. When the second RFID device is opened, so that the container door is allowed to open, the first RFID device can sense this and change its broadcast message to include that the second RFID device was opened.

8 Claims, 5 Drawing Sheets

ASSET SEALING AND TRACKING SYSTEM AND METHOD

FIELD OF THE INVENTION

This invention is generally directed to the field of asset tracking and in particular to the field of tracking assets and states of a door giving access to goods positioned within the asset.

BACKGROUND OF THE INVENTION

Commercial shipping operations include movement of cargo using intermodal containers. A substantial amount of world cargo transport is completed using these intermodal containers. Intermodal transport typically happens as follows. A manufacturer stuffs a container with goods. This container is drayed on a ship to a marine terminal, such as Port Qasim Karachi, Pakistan. A steamship line, or carrier, transports the container on an ocean to another marine terminal, such as the Port of Oakland in California. The container is removed from the ship to a truck to dray the container to a rail ramp, such as BNSF'S Oakland International Gateway. The container is then transported by rail, for example to a distant rail ramp, such as the BNSF intermodal rail ramp in Willow Springs, Ill. From there the container is drayed to a consignee warehouse—say Wal-Mart where the goods are stripped.

Cargo security and transport efficiency are major concerns. Radio frequency identification devices (RFID) are used today to monitor a seal state of a container door. These devices are commonly referred to as electronic seals or eSeals. Knowing the seal state of a container door is important to predict that the cargo in the container may have been tampered with illicitly during transport.

Furthering the former example, after a container is stuffed with goods at a point of origin, the container doors are closed and an eSeal is installed on a door locking mechanism. The eSeal then begins to transmit a "sealed" status. This transmitted seal status can be read by an RFID reader and routed to an entity, such as a carrier, for monitoring the seal state of the container. Later when the seal is opened and thus the door can be opened the eSeal transmits an "opened" state to another reader. One problem is how to associate the eSeal with the particular container that it's sealing. Presently this is done manually by a process. For example when the eSeal is affixed and activated an operator will look at the container's identification markings—which are painted on various parts of the container, and read the eSeal identification number, either visually from the tags itself or by using an electronic reader. These two identities are then entered into a database that will be accessible by people who need to understand the location and seal status of the particular container. This manual process is problematic because using humans to do this process is time consuming and inaccurate. Moreover the seal state of the door of a particular container is important to know while in transit without human intervention in trans-shipment ports, such as in Singapore, where human intervention is not practical. Prior art eSeals alone won't work here because they don't include the container identity. Even though the database can have the association there is no positive confirmation that a container is at a location and its seal status is known.

What is needed is a solution that associates the container and the seal state of its door automatically at a point of origin, at certain way points when the container is in transit, and at points of destination without human intervention.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to methods and apparatus for electronic seals. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Figure 1:
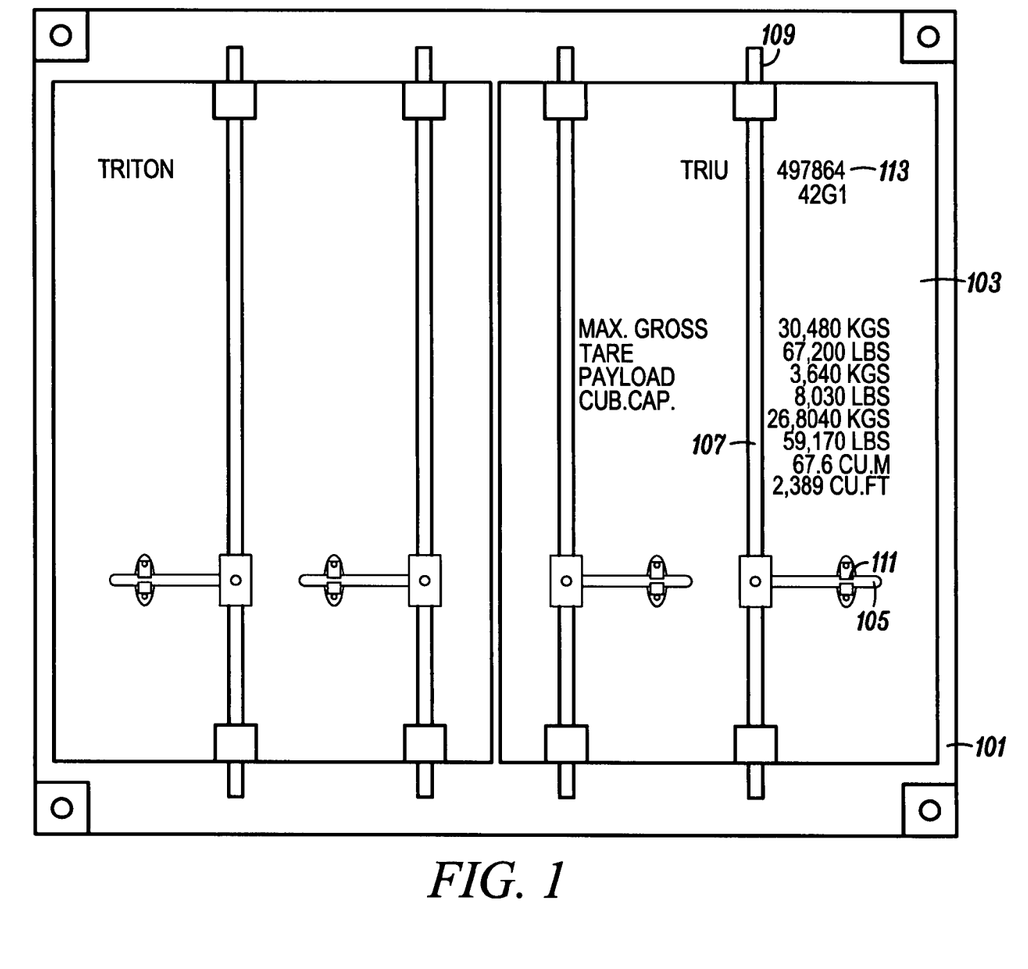
FIG. 1 is a diagram of a rear door of an intermodal container.

FIG. 1 is a diagram of a rear door of an intermodal container. Intermodal containers are largely defined by the International Organization for Standardization (ISO). A rear door assembly 101, includes a door 103 opened and closed using handles 105 each connected to a lock shaft 107 connected to a locking mechanism 109. Note that the handle 105 is captivated by a lock hasp 111. A seal mechanism is typically inserted into the hasp 111 to prevent the handle 105 from being used to open the door 103. Note also that the container is identified by a unique license plate number 113 in accordance with an ISO standard.

Figures 2, 3, 4, 5:
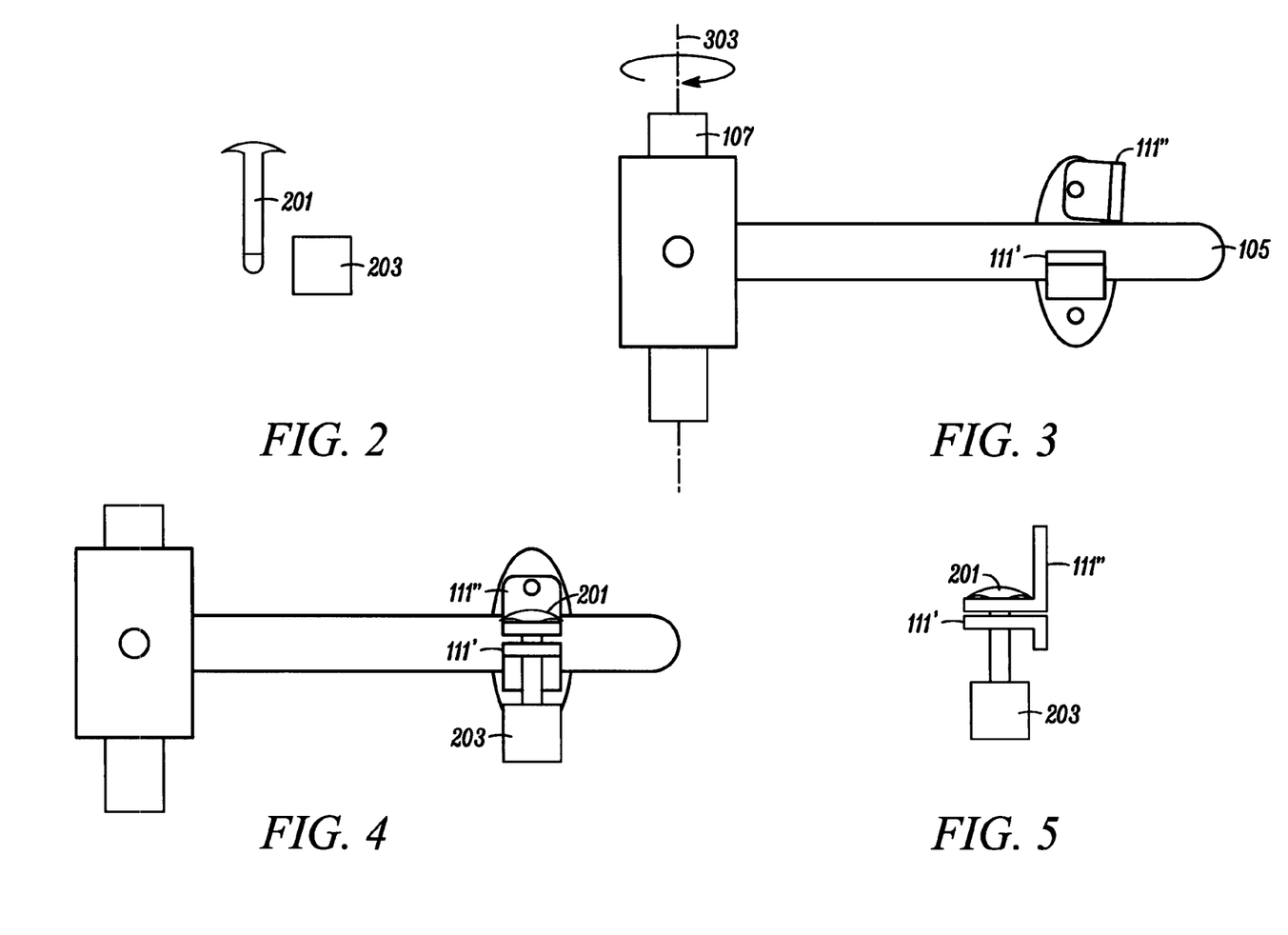
FIG. 2 is an illustration of a conventional bolt seal for sealing an intermodal container.
FIG. 3 is a detailed view showing operation of a door opening mechanism on an intermodal container.
FIG. 4 shows a conventional bolt seal sealing a door opening mechanism on an intermodal container.
FIG. 5 illustrates a different view of the mechanism shown in FIG. 4.

FIG. 2 is an illustration of a conventional bolt seal for sealing an intermodal container. There are many variations on bolt seals but the device is very common. The bolt seal comprises a bolt 201 and a captivating portion 203. Note that the captivating portion 203 typically has a unique serial number identifier (not shown) that is used by various entities in the transportation system.

Next, operation of a door opening mechanism on an intermodal container is described in FIG. 3. A lower hasp mechanism 111' cradles the handle 105. To open the container door an upper hasp mechanism 111" is rotated allowing the handle 105 to be lifted up from the lower hasp mechanism 111'. Once the handle 105 is lifted sufficiently an operator pulls the handle 105 away from the container door causing the lock shaft 107 to rotate about an axis 303. After sufficient rotation the locking mechanism 109 shown in FIG. 1 is opened allowing the door 103 to be opened. In practice both handles shown in FIG. 1 associated with the door 103 must be used to open the door 103.

Referring now to FIG. 4 the bolt 201 is inserted through the upper hasp mechanism 111", the lower hasp mechanism 111' and captivated by the captivating portion 203. The container door 103 shown in FIG. 1 is now sealed. Both the head of the bolt 201 and the breadth of the captivating portion 203 do not allow the removal of the bolt seal. To remove the seal one must use a bolt cutter or other equivalent device to sever the bolt allowing it to be removed from the upper hasp mechanism 111" and the lower hasp mechanism 111'.

FIG. 5 illustrates a different view of the mechanism shown in FIG. 4. Again the bolt 201 is inserted through the upper hasp mechanism 111", the lower hasp mechanism 111' and captivated by the captivating portion 203.

FIG. 1 through FIG. 5 illustrate industry convention. Various embodiments illustrating the improved device and method will be detailed next.

Figure 6:
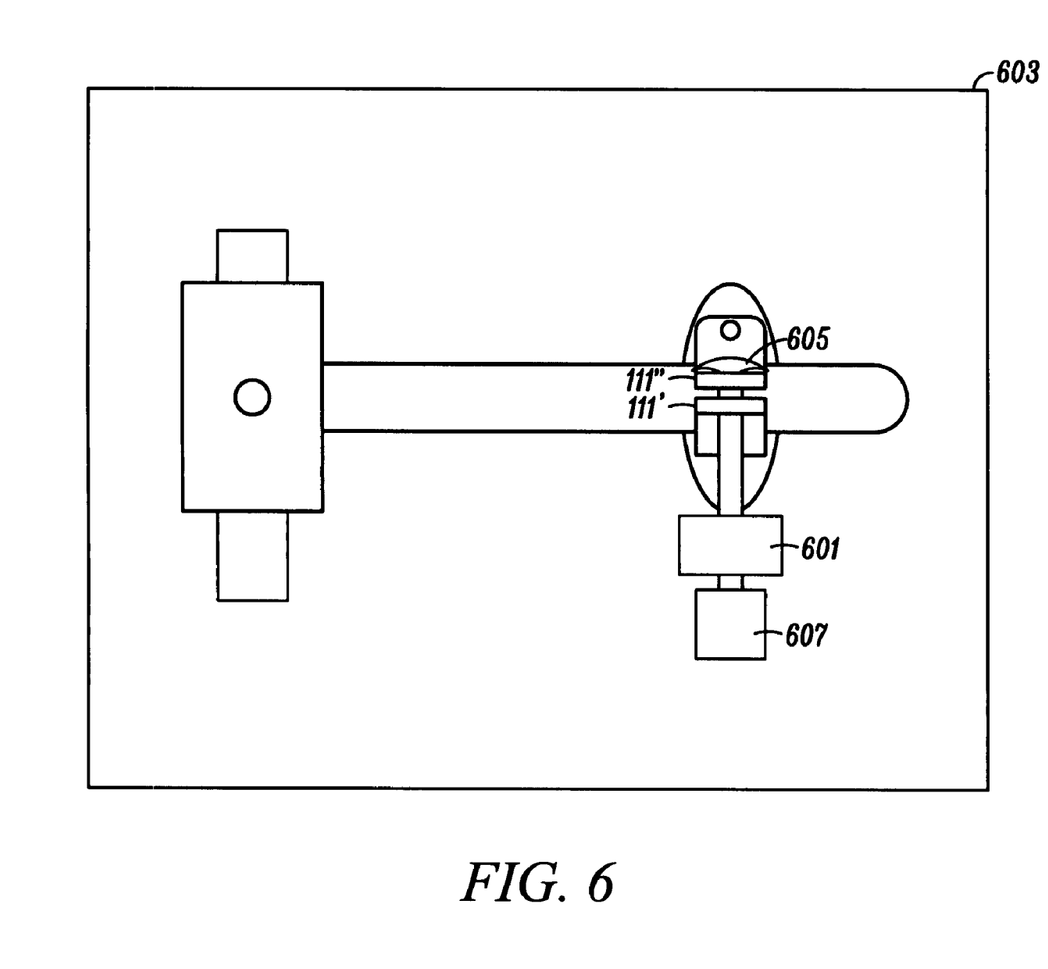
FIG. 6 shows an electronic seal in accordance with one embodiment of the invention that includes captivation and association of container identification.

As described in the background, the license plate number 113, illustrated in FIG. 1, needs to be associated with a container seal. Keeping this relationship in mind FIG. 6 shows a device in accordance with one embodiment of the invention that includes captivation and association of container identification. Here an eSeal base 601, or eSeal base—identifying the asset identity, of an improved asset sealing and tracking device is affixed to a container door 103. Preferably this eSeal base 601 is permanently affixed so that it remains with the container during the container's lifetime. This eSeal base 601 includes an RFID device that embodies a facsimile of the earlier described license plate number 113, illustrated in FIG. 1, herein referred to as a license plate identification number (LPID).

A second portion of the improved asset sealing and tracking device is a bolt-like mechanism 605 that is securely captivated by a captivating portion 607. The combination of 605 and 607 is referred to as an eSeal. Either the second portion 605, the captivating portion 607, or both portions 605, 607 form an electrical circuit that has a unique identification, herein referred to as an electronic seal identification number (eSeal ID). The second portion 605 and the captivating portion 607 form a removable eSeal.

Once the bolt-like mechanism 605 is inserted through the upper hasp mechanism 111" and the lower hasp mechanism 111' and is captivated by the captivating portion 607, the eSeal ID is communicated to the eSeal base 601. In turn the eSeal base 601 associates its own LPID with the communicated eSeal ID; the eSeal base 601 essentially inheriting the eSeal ID from the removable eSeal. In one embodiment, the eSeal base 601 transmits the associated IDs to a local RFID reader. Thus at a location where the container is stuffed then sealed, the seal and the container are married and a reader conveys this information e.g. to a database for retrieval by interested parties. Optionally, when the IDs are associated the RFID device in the eSeal base 601 can transmit a symbol indicating that the container door is sealed. One advantage of this device and associated method is that the eSeal ID is automatically associated with the container ID (LPID) when a shipper seals the container door without introducing any new business processes.

When the container is moved through a trans-shipment port, say in Singapore, a local reader can then read the associated IDs. This association can be verified at various waypoints and at a destination location by using local readers.

If either the second portion 605 is cut and the second portion 605 and the captivating portion 607 are removed from the upper hasp mechanism 111" and the lower hasp mechanism 111' or the captivating portion 607 is cut off and the second portion 605 remains captivated in the upper hasp mechanism 111" and the lower hasp mechanism 111', the eSeal base 601 has means to sense this physical action and either disassociates the eSeal ID from the LPID and reverts to transmitting only the LPID, or the eSeal base 601 reverts to transmitting the LPID and a symbol (seal status) indicating that the eSeal is now open, or transmits the LPID, eSeal ID and the seal status.

Seals can be opened, illicitly, at federal customs locations, and at a consignee location. As mentioned earlier the eSeal base 601 can indicate that the seal was "opened". If the opening is illicit then a reader can sense this condition and report it. If a federal customs agent opens the seal, the eSeal base 601 will still indicate that the seal was "opened". A federal agent can then install another bolt-like mechanism 605 and captivating portion 607 to reseal the container. In this case the eSeal base 601 will inherit the identity of the new bolt-like mechanism 605 and/or captivating portion 607. The portion 601 combines the inherited identity with its own identity and optionally any historical identity of prior bolt-like mechanisms 605 and/or captivating portions 607 and makes this available including the eSeal status to a reader. If the eSeal is opened at a consignee location and stripped, the eSeal base recognizes the removal of the eSeal and notes the seal state and makes this available to a reader. Later, when the container is deployed to another shipper, stuffed and sealed, the eSeal base 601 will inherit the identity of the new eSeal. As stated earlier the eSeal base makes the LPID and the new eSeal identity available for a reader. It can also keep a running history of eSeals used in the past and make that available to the reader.

In one embodiment the removable eSeal is a passive device -meaning it has no battery. One possibility is to use a conventional passive RFID device. Other embodiments can use chipless devices such as SAW (Surface Acoustic Wave) devices. These passive RFIDs and SAWs are interrogated by the RFID device contained in the eSeal base 601. Thus, the RFID device contained in the eSeal base 601 can be an active RFID device that includes a battery for power and a communication device for communicating the coupled eSeal identity and LPID to a reader such as, for instance, any suitable transmitter as is well known in the art.[VMD1]

Alternatively, those skilled in the art will recognize various similar arrangements of RFID technology without departing from the essential teachings here.

Figure 7:
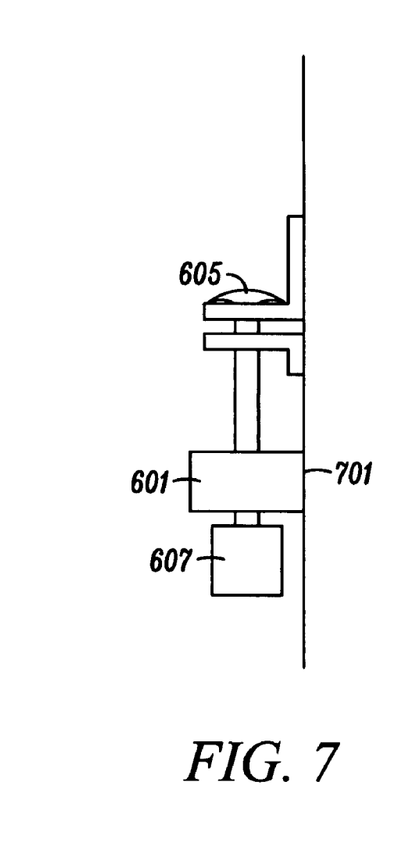
FIG. 7 is a diagram illustrating another view of the seal introduced in FIG. 6.

In FIG. 7 the eSeal base 601 is coupled to an asset—here a container door 701. After the container door is closed, the bolt-like mechanism 605 is inserted through the hasp mechanism and is securely captivated by a captivating portion 607. The process of inserting the bolt-like mechanism 605 and/or affixing the captivating portion 607 causes the eSeal ID to be communicated to the eSeal base 601. Note that the portion 601 is an embodiment of an RFID tag that combines its own unique identity with the inherited identity from either the bolt-like mechanism 605 and/or the captivating portion 607.

Figure 8:
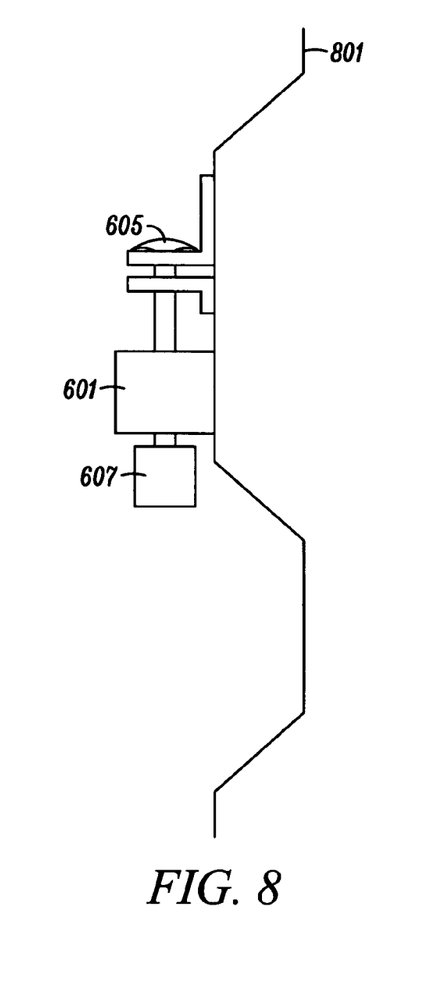
FIG. 8 illustrates another view of the seal introduced in FIG. 6.

FIG. 8 illustrates another view of the eSeal (combination of 605 and 607) and eSeal base 601 introduced in FIG. 6 as mounted on an ISO (International Standards Organization) compliant intermodal container door 801. Notice that the container door is not flat but rather it's corrugated. This can be problematic for an eSeal base and eSeal if the hasp mechanism is not positioned where the eSeal base can be physically affixed to the door 601 because of the physical properties of the door 801.

Figure 9:
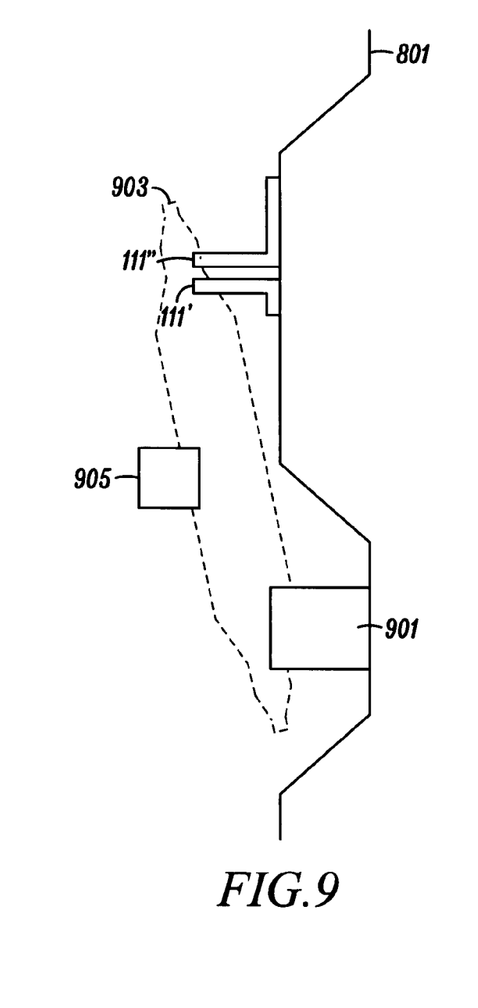
FIG. 9 illustrates an electronic seal in accordance with another embodiment of the invention.

Referring to FIG. 9 another embodiment is described overcoming the physical limitations of the above described problem. Here an eSeal base 901 is affixed to the container door 801 apart from the hasp mechanism 111', 111". This arrangement allows the eSeal base to be affixed apart from the eSeal portion so that a suitable mounting surface can be used. Here an alternate eSeal mechanism 903 and 905 is introduced. Note that a cable-like mechanism 903 allows the eSeal base 901 to be mounted apart from the hasp mechanism 111', 111". Here the captivating device is 905. Again the eSeal contains a unique ID that gets transferred to the eSeal base 901 when the cable 903 is threaded through the hasp and the eSeal base 901 and captivated with article 905.

In summary a first RFID device is permanently affixed to a container door and removable second RFID device is coupled to the first RFID device—with the second RFID device being inserted through a locking hasp of the container door. The first RFID device inherits an identity of the second RFID device thereby automatically associating the two devices. Thereafter the first RFID device can broadcasts both identities. When the second RFID device is opened, so that the container door is allowed to open, the first RFID device senses this and changes its broadcast message to include that the second RFID device was opened.

Figure 10:
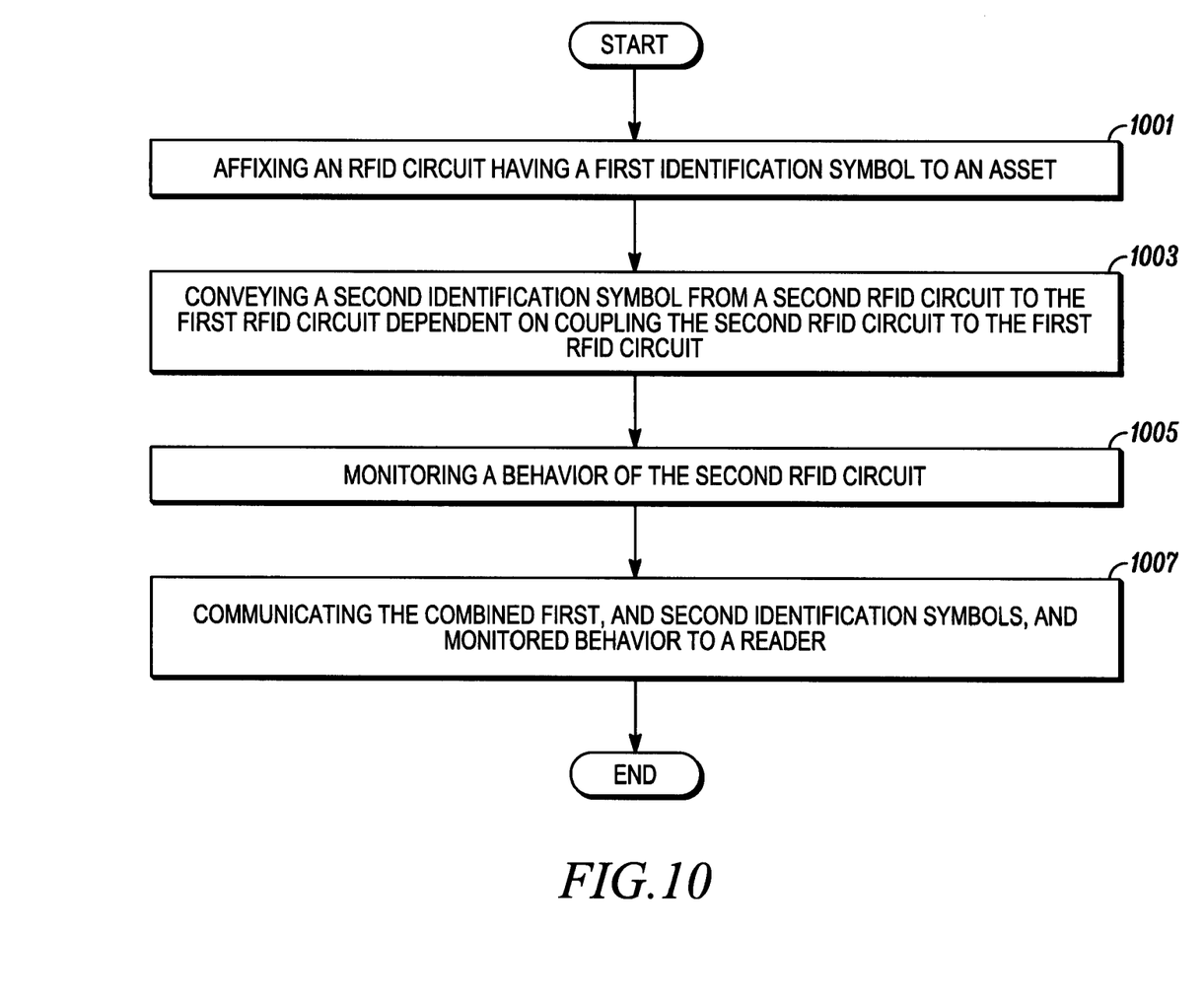
FIG. 10 illustrates a flow diagram describing an asset sealing and association method in accordance with a method embodiment of the invention.

FIG. 10 illustrates a flow diagram describing an asset sealing and association method in accordance with another embodiment of the invention.

In step 1001 an RFID device having a first identity, or identification symbol, is affixed to an asset. This can be any physical asset such as an intermodal container.

Next, in step 1003 a second identity, or identification symbol, is communicated from a second RFID device to the first RFID device dependent on coupling the second RFID device to the first RFID device. Referring back to FIG. 6 the RFID device having a first identification symbol is represented by item 601 and the second RFID device is shown as items 605 and 607.

Then in step 1005 a behavior of the second RFID device is monitored. In the earlier described application this would be monitoring a state of the eSeal device. In a simple case this may be monitoring presence of the eSeal, but other functions could also be easily monitored. For example a parameter such as temperature of the eSeal could be monitored and communicated to the eSeal base.

In step 1007 the combined first, and second identification symbols, and monitored behavior is communicated to a reader.

The above-described approach overcomes problems of prior art approaches by providing an eSeal base generally permanently affixed to an asset for identifying that asset during its lifetime. A removable eSeal portion having a unique ID is coupled to the eSeal base and transfers its unique identity to the eSeal base. The eSeal base in turn makes both IDs and the removable eSeal's status available to a reader. One advantage is that an operator continues using the same business practices as today. There is no need to manually associate, record and report the identities of a container and its associated seal. Also, the process of reading the identities of the container, seal and seal state can be done automatically without human intervention. Another advantage is that rather than having a separate container ID RFID tag and eSeal tag each transmitting information to a reader, the transmission function can be singular and the IDs joined together before transmission. This makes the RF (Radio Frequency) spectrum usage density lower because ½ the amount of transmitters are transmitting per container.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, the terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A system for tracking an asset by an RFID reader, the system comprising:
   a mechanism disposed on the asset to allow access to the asset when the mechanism is in a first position and to deny access to the asset when the mechanism is in a second position;
   a first RFID device having a first identity affixable to the asset; and
   a second RFID device disposed with the mechanism and comprising a second identity and a measurable parameter indicating whether the mechanism is in the first or second position, wherein the first RFID device receives the second identity and the measurable parameter from the second RFID device and communicates the first and second identity and the measurable parameter to the RFID reader.

2. A system in accordance with claim 1 wherein the RFID device comprises a transmitter for communicating the first and second identity and the measurable parameter to the RFID reader.

3. A system in accordance with claim 1 wherein the measurable parameter comprises detection of presence of the second RFID device.

4. A system in accordance with claim 3 wherein the measurable parameter comprises detection of absence of the second RFID device.

5. A system in accordance with claim 1 wherein the first RFID device further comprises a communication device for communicating the first and second identity to an RFID reader.

6. A system in accordance with claim 1 wherein the first RFID device comprises an active RFID device.

7. A system in accordance with claim 1 wherein the second RFID device comprises a passive RFID device.

8. A method for asset tracking by a reader comprising the steps of:
- affixing a first RFID device having a first identification symbol to an asset;
- affixing a second RFID device having a second identification symbol to a locking mechanism affixed to the asset, the second identification symbol including behavior information indicating whether the locking mechanism is locked or unlocked; and
- communicating the a second identification symbol to the first RFID device for subsequent transmission to the reader.

* * * * *

UNITED STATES PATENT AND TRADEMARK OFFICE
CERTIFICATE OF CORRECTION

PATENT NO. : 7,528,719 B2  Page 1 of 1
APPLICATION NO. : 11/304290
DATED : May 5, 2009
INVENTOR(S) : Hopman It is certified that error appears in the above-identified patent and that said Letters Patent is hereby corrected as shown below:

In the claims

In Column 8, Line 14, in Claim 8, after "communicating the" delete "a".

Signed and Sealed this
Fourth Day of October, 2011

David J. Kappos
*Director of the United States Patent and Trademark Office*